(12) United States Patent
Kim (10) Patent No.: US 12,247,116 B2
(45) Date of Patent: Mar. 11, 2025

(54) ANTENNA MODULE

(71) Applicant: Ticona LLC, Florence, KY (US)

(72) Inventor: Young Shin Kim, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 179 days.

(21) Appl. No.: 17/990,784

(22) Filed: Nov. 21, 2022

(65) Prior Publication Data

US 2023/0167274 A1 Jun. 1, 2023

Related U.S. Application Data

(60) Provisional application No. 63/284,819, filed on Dec. 1, 2021.

(51) Int. Cl.
*C08K 7/10* (2006.01)
*C08K 3/34* (2006.01)
(Continued)

(52) U.S. Cl.
CPC ............... *C08K 7/10* (2013.01); *C08K 3/346* (2013.01); *C09D 1/00* (2013.01); *H01Q 1/50* (2013.01); *H01Q 1/526* (2013.01); *H01Q 9/0407* (2013.01)

(58) Field of Classification Search
CPC ............ H01Q 1/38; H01Q 1/50; H01Q 1/526; H01Q 9/0407; C09D 1/00; C08K 3/346; C08K 7/10; C08K 7/14
See application file for complete search history.

(56) References Cited

U.S. PATENT DOCUMENTS

| 4,161,470 A | 7/1979 | Calundann |
| 4,458,039 A | 7/1984 | Eickman |

(Continued)

FOREIGN PATENT DOCUMENTS

| EP | 0 312 331 A2 | 4/1989 |
| EP | 0 312 331 A3 | 4/1989 |

(Continued)

OTHER PUBLICATIONS

Article—Liu et al., "Immobilization and melting point depression of imidazolium ionic liquids on the surface of nano-SiO$_x$ particles," *Dalton Trans.*, vol. 39, 2010, pp. 3190-3194.

(Continued)

*Primary Examiner* — Monica C King
(74) *Attorney, Agent, or Firm* — Dority & Manning, P.A.

(57) ABSTRACT

An antenna module is provided. The antenna module comprises a dielectric on which is disposed one or more antenna elements configured to transmit and/or receive a radiofrequency signal; a communication circuit for processing the radiofrequency signal; an interconnect member that is electrically connected with the communication circuit and the antenna elements, wherein the interconnect member optionally contains a substrate on which a metal coating is disposed; and optionally, a shield member covering the communication circuit that contains a substrate on which a metal coating is disposed. The dielectric, the substrate of the interconnect member, and/or the substrate of the shield member contain a polymer composition comprising silicate fibers distributed within a polymer matrix that includes a thermotropic liquid crystalline polymer.

39 Claims, 4 Drawing Sheets

(51) Int. Cl.
*C09D 1/00* (2006.01)
*H01Q 1/50* (2006.01)
*H01Q 1/52* (2006.01)
*H01Q 9/04* (2006.01)

(56) References Cited

U.S. PATENT DOCUMENTS

| | | |
|---|---|---|
| 4,943,606 A | 7/1990 | Inoue et al. |
| 5,352,746 A | 10/1994 | Asai et al. |
| 5,375,403 A | 12/1994 | Capote et al. |
| 5,492,946 A | 2/1996 | Huspeni et al. |
| 5,508,374 A | 4/1996 | Lee et al. |
| 5,538,666 A | 7/1996 | Jin |
| 5,616,680 A | 4/1997 | Linstid, III |
| 5,830,940 A | 11/1998 | Nakamura et al. |
| 5,847,039 A | 12/1998 | Nagashima et al. |
| 5,928,589 A | 7/1999 | Norota et al. |
| 5,962,122 A | 10/1999 | Walpita et al. |
| 5,997,765 A | 12/1999 | Furuta et al. |
| 6,010,760 A | 1/2000 | Miyazaki et al. |
| 6,046,300 A | 4/2000 | Umetsu et al. |
| 6,063,848 A | 5/2000 | Murakami et al. |
| 6,114,492 A | 9/2000 | Linstid, III et al. |
| 6,140,455 A | 10/2000 | Nagashima et al. |
| 6,153,121 A | 11/2000 | Makabe et al. |
| 6,319,564 B1 | 11/2001 | Naundorf et al. |
| 6,379,795 B1 | 4/2002 | Bisaria et al. |
| 6,492,463 B1 | 12/2002 | Waggoner |
| 6,495,616 B2 | 12/2002 | Maeda |
| 6,514,611 B1 | 2/2003 | Shepher et al. |
| 6,613,847 B2 | 9/2003 | Soelch |
| 6,680,002 B2 | 1/2004 | Yamauchi et al. |
| 6,702,955 B1 | 3/2004 | Murakami et al. |
| 6,702,956 B2 | 3/2004 | Maeda et al. |
| 6,723,679 B2 | 4/2004 | Izaki et al. |
| 6,733,691 B2 | 5/2004 | Nagano et al. |
| 6,755,992 B2 | 6/2004 | Okamoto et al. |
| 6,758,989 B2 | 7/2004 | Miyashita et al. |
| 6,797,198 B1 | 9/2004 | Miyashita et al. |
| 6,833,405 B1 | 12/2004 | Cottis |
| 6,861,463 B2 | 3/2005 | Cottis |
| 7,166,238 B2 | 1/2007 | Kato et al. |
| 7,175,779 B1 | 2/2007 | Kricheldorf et al. |
| 7,189,778 B2 | 3/2007 | Tobita et al. |
| 7,251,405 B2 | 7/2007 | Shelnut et al. |
| 7,276,284 B2 | 10/2007 | Frohs |
| 7,344,657 B2 | 3/2008 | Okamoto et al. |
| 7,438,832 B2 | 10/2008 | Majumdar et al. |
| 7,540,991 B2 | 6/2009 | Shimoyama et al. |
| 7,547,403 B2 | 6/2009 | Miyashita et al. |
| 7,601,771 B2 | 10/2009 | Schmidt et al. |
| 7,641,833 B2 | 1/2010 | Aoki et al. |
| 7,648,748 B2 | 1/2010 | Nakane et al. |
| 7,704,408 B2 | 4/2010 | Fukatsu |
| 7,740,770 B2 | 6/2010 | Mizumoto et al. |
| 7,789,670 B2 | 9/2010 | Fukatsu et al. |
| 7,824,572 B2 | 11/2010 | Okamoto |
| 7,825,176 B2 | 11/2010 | Kim et al. |
| 7,892,450 B2 | 2/2011 | Uchida et al. |
| 7,931,824 B2 | 4/2011 | Gin et al. |
| 7,980,897 B2 | 7/2011 | Fukatsu et al. |
| 8,029,694 B2 | 10/2011 | Saga |
| 8,142,683 B2 | 3/2012 | Murouchi et al. |
| 8,202,448 B2 | 6/2012 | Fukuhara et al. |
| 8,231,805 B2 | 7/2012 | Fukuhara et al. |
| 8,272,879 B2 | 9/2012 | Fukatsu et al. |
| 8,324,307 B2 | 12/2012 | Harder et al. |
| 8,432,484 B2 | 4/2013 | Christison |
| 8,440,780 B2 | 5/2013 | Hamaguchi et al. |
| 8,465,670 B2 | 6/2013 | Kondo et al. |
| 8,545,719 B2 | 10/2013 | Komatsu et al. |
| 8,646,994 B2 | 2/2014 | Kim et al. |
| 8,658,057 B2 | 2/2014 | Nakayama et al. |
| 8,696,932 B2 | 4/2014 | Uchida et al. |
| 8,697,817 B2 | 4/2014 | Waggoner et al. |
| 8,778,220 B2 | 7/2014 | Lee et al. |
| 8,778,222 B2 | 7/2014 | Matsubara et al. |
| 8,778,247 B2 | 7/2014 | Stoeks et al. |
| 8,784,683 B2 | 7/2014 | Matsubara et al. |
| 8,834,741 B2 | 9/2014 | Shiraishi et al. |
| 8,906,259 B2 | 12/2014 | Kim |
| 8,932,483 B2 | 1/2015 | Kim |
| 8,980,986 B2 | 3/2015 | Lee et al. |
| 9,018,315 B2 | 4/2015 | Waggoner et al. |
| 9,045,621 B2 | 6/2015 | Matsubara et al. |
| 9,045,685 B2 | 6/2015 | Nair et al. |
| 9,051,514 B2 | 6/2015 | Nair et al. |
| 9,096,794 B2 | 8/2015 | Nair et al. |
| 9,103,020 B2 | 8/2015 | Gong et al. |
| 9,109,111 B2 | 8/2015 | Lee et al. |
| 9,163,177 B2 | 10/2015 | Imaizumi et al. |
| 9,284,435 B2 | 3/2016 | Kim |
| 9,512,293 B2 | 12/2016 | Kim |
| 9,822,254 B2 | 11/2017 | Kim |
| 9,988,519 B2 | 6/2018 | Kim |
| 10,280,282 B2 | 5/2019 | Kim |
| 10,280,332 B2 | 5/2019 | Moussa et al. |
| 10,433,428 B2 | 10/2019 | Spiegel et al. |
| 10,667,407 B2 | 5/2020 | Spiegel et al. |
| 10,829,634 B2 | 11/2020 | Kim |
| 10,862,201 B2 | 12/2020 | Sato |
| 10,941,275 B2 | 3/2021 | Kim |
| 11,136,445 B2 | 10/2021 | Kim |
| 11,258,184 B2 | 2/2022 | Kim et al. |
| 11,555,113 B2 | 1/2023 | Kim et al. |
| 2002/0064701 A1 | 5/2002 | Hand et al. |
| 2002/0190432 A1 | 12/2002 | Shiwaku et al. |
| 2005/0077498 A1 | 4/2005 | Kato et al. |
| 2005/0176835 A1 | 8/2005 | Kobayashi et al. |
| 2005/0191877 A1 | 9/2005 | Huang |
| 2005/0260361 A1 | 11/2005 | Alms et al. |
| 2006/0009580 A1 | 1/2006 | Alms et al. |
| 2006/0014876 A1 | 1/2006 | Bushelman et al. |
| 2006/0025561 A1 | 2/2006 | Watanabe et al. |
| 2007/0057236 A1 | 3/2007 | Hosoda et al. |
| 2007/0190346 A1 | 8/2007 | Ikegawa |
| 2008/0187734 A1* | 8/2008 | Morin .......... H05K 1/0366 428/292.1 |
| 2009/0027586 A1 | 1/2009 | Kumai et al. |
| 2009/0212684 A1 | 8/2009 | Saito et al. |
| 2009/0289340 A1* | 11/2009 | Yamazaki ...... G06K 19/07749 257/679 |
| 2011/0171452 A1 | 7/2011 | Öttinger et al. |
| 2011/0189454 A1 | 8/2011 | Fukuhara et al. |
| 2012/0135228 A1 | 5/2012 | Fukuhara et al. |
| 2012/0199790 A1 | 8/2012 | Yun et al. |
| 2013/0015411 A1 | 1/2013 | Kang et al. |
| 2013/0052447 A1 | 2/2013 | Grenci et al. |
| 2013/0123420 A1 | 5/2013 | Kim |
| 2013/0200297 A1 | 8/2013 | Saga |
| 2014/0028518 A1* | 1/2014 | Arnold .......... H01Q 1/2283 343/841 |
| 2015/0175805 A1 | 6/2015 | Schaefer |
| 2015/0274965 A1 | 10/2015 | Nair et al. |
| 2020/0308487 A1 | 10/2020 | Hegi |
| 2020/0347303 A1 | 11/2020 | Pan et al. |
| 2021/0061994 A1 | 3/2021 | Kim |
| 2021/0143539 A1* | 5/2021 | Yuan .......... B32B 27/288 |
| 2021/0189095 A1 | 6/2021 | Kim |
| 2021/0261755 A1 | 8/2021 | Kim |
| 2021/0261771 A1 | 8/2021 | Kim |
| 2021/0265075 A1 | 8/2021 | Kim |
| 2021/0273036 A1 | 9/2021 | Marin et al. |
| 2021/0274652 A1 | 9/2021 | Kim |
| 2022/0025153 A1 | 1/2022 | Kim |
| 2022/0037050 A1 | 2/2022 | Kim |
| 2022/0127499 A1 | 4/2022 | Kim |
| 2022/0149541 A1 | 5/2022 | Kim et al. |
| 2023/0391955 A1* | 12/2023 | Maeno .......... H05K 1/0346 |

FOREIGN PATENT DOCUMENTS

| | | |
|---|---|---|
| EP | 1 116 769 A2 | 7/2001 |
| EP | 1 116 769 A3 | 7/2001 |

(56) References Cited

FOREIGN PATENT DOCUMENTS

| | | |
|---|---|---|
| EP | 1 382 437 A2 | 1/2004 |
| EP | 1 382 437 A3 | 1/2004 |
| EP | 1 699 228 A1 | 9/2006 |
| JP | H 0481451 A | 3/1992 |
| JP | H 05140282 A | 6/1993 |
| JP | H 0718162 A | 1/1995 |
| JP | H 09143347 A | 6/1997 |
| JP | H 09297256 A | 11/1997 |
| JP | H 1160927 A | 3/1999 |
| JP | H 1180517 A | 3/1999 |
| JP | H 1180518 A | 3/1999 |
| JP | H 11147999 A | 6/1999 |
| JP | 2000080289 A | 3/2000 |
| JP | 2000273292 A | 10/2000 |
| JP | 2000273320 A | 10/2000 |
| JP | 2000281885 A | 10/2000 |
| JP | 2004182895 A | 7/2004 |
| JP | 2004263162 A | 9/2004 |
| JP | 2005187696 A | 7/2005 |
| JP | 2008075079 A | 4/2008 |
| JP | 2008214573 A | 9/2008 |
| JP | 2009155436 A | 7/2009 |
| JP | 2009242454 A | 10/2009 |
| JP | 2009242455 A | 10/2009 |
| JP | 5172279 B2 | 3/2013 |
| KR | 20120114048 A | 10/2012 |
| KR | 20130047456 A | 5/2013 |
| WO | WO 2004/058851 A1 | 7/2004 |
| WO | WO 2005/063889 A1 | 7/2005 |
| WO | WO 2006/104701 A1 | 10/2006 |
| WO | WO 2006/126861 A1 | 11/2006 |
| WO | WO 2009/005317 A2 | 1/2009 |
| WO | WO 2009/005317 A3 | 1/2009 |
| WO | WO 2010/013578 A1 | 2/2010 |
| WO | WO 2012/050082 A1 | 4/2012 |
| WO | WO 2013/032970 A1 | 3/2013 |
| WO | WO 2013/066003 A | 5/2013 |
| WO | WO 2013/074469 A1 | 5/2013 |
| WO | WO 2013/074475 A1 | 5/2013 |
| WO | WO 2013/129338 A1 | 9/2013 |
| WO | WO 2016/003588 A1 | 1/2016 |
| WO | WO 2016/209792 A1 | 12/2016 |
| WO | WO 2017/004064 A1 | 1/2017 |
| WO | WO 2019/042906 A1 | 3/2019 |

OTHER PUBLICATIONS

Article—Möhwald et al., "Laser Beam Activation of CNT-Filled Polymer Blends," *Laser Technik Journal*, Feb. 2015, pp. 52-55 (© 2015 Wiley-VCH Verlag GmbH & Co. KGaA, Weinheim).

Article—Zaderej et al., "ASEP (Application Specific Electronics Package) A Next Generation Electronics Manufacturing Technology," Proceedings of SMTA International, 2018, 8 pages.

Product and Property Guide for DuPont™ Zenite® LCP liquid crystal polymer resin, May 2006, 33 pages.

Product Information—Sigrafil® C, The Carbon Fiber for Thermoplastic Compounds from SGL Group, 2009, 4 pages.

Product Information on Talc from Nippon Talc Co., Ltd., 5 pages.

Related Application Form.

Search Report and Written Opinion for PCT/US2022/050577 dated Feb. 27, 2023, 11 pages.

\* cited by examiner

ANTENNA MODULE

RELATED APPLICATION

The present application is based upon and claims priority to U.S. Provisional Patent Application Ser. No. 63/284,819, having a filing date of Dec. 1, 2021, which is incorporated herein by reference.

BACKGROUND OF THE INVENTION

To form antenna modules, particularly those used at high frequencies, molded interconnect devices (MIDs) are employed that contain a plastic substrate on which is formed conductive elements or pathways. Such MID devices are thus three-dimensional molded parts having an integrated printed conductor or circuit layout. MIDs are typically formed using a laser direct structuring ("LDS") process during which a computer-controlled laser beam travels over the plastic substrate to activate its surface at locations where the conductive path is to be situated. Various materials have been proposed for forming the plastic substrate of a laser direct structured device. For example, one such material is a blend of polycarbonate, acrylonitrile butadiene styrene, and copper chromite. During the laser direct structuring process, the copper chromite is cracked open to release metal atoms, which can act as a nuclei for crystal growth during a subsequent electroless copper plating process. Despite its benefits, one of the limitations of laser direct structured materials is that the spinel crystals tend to adversely impact the performance of the composition in certain circumstances. As such, most conventional LDS compositions need glass fiber reinforcement to achieve a sufficient degree of strength. Unfortunately, the glass fibers tend to extend from the surface of the part and thus lead to poor weldline tensile properties, which makes it difficult to mate with other types of electronic components.

As such, a need currently exists for an antenna module in which conductive elements (e.g., antenna resonating elements) can be readily formed on a substrate without adversely impact other properties.

SUMMARY OF THE INVENTION

In accordance with one embodiment of the present invention, an antenna module is disclosed that comprises a dielectric on which is disposed one or more antenna elements configured to transmit and/or receive a radiofrequency signal; a communication circuit for processing the radiofrequency signal; an interconnect member that is electrically connected with the communication circuit and the antenna elements, wherein the interconnect member optionally contains a substrate on which a metal coating is disposed; and optionally, a shield member covering the communication circuit that contains a substrate on which a metal coating is disposed. The dielectric, the substrate of the interconnect member, and/or the substrate of the shield member contain a polymer composition comprising silicate fibers distributed within a polymer matrix that includes a thermotropic liquid crystalline polymer.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which:

FIGS. 3A-3D are four different views of the antenna module of FIG. 1 in which FIG. 3A is a top view, FIG. 3C is a front view, and FIG. 3D is a side view; and FIGS. 4A and 4B are two cross-sectional views of the antenna module of FIG. 1 in which

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to an antenna module that contains a dielectric on which is disposed one or more antenna elements configured to transmit and/or receive a radiofrequency signal, a communication circuit for processing the radiofrequency signal, an interconnect member that is electrically connected with the communication circuit and the antenna elements, and optionally a shield member that covers the communication circuit. Notably, the dielectric, interconnect member, and/or shield member may include a polymer composition that contains silicate fibers and a polymer matrix containing at least one thermotropic liquid crystalline polymer. By selectively controlling various aspects of the composition, the present inventor has discovered that the resulting composition may be readily plated without adversely impacting other properties. For example, the polymer composition can exhibit improved weldline tensile properties. For example, the polymer composition may exhibit a weldline tensile break strain of about 0.3% or more, in some embodiments about 0.33% or more, and in some embodiments, about 0.35% or more. Likewise, the polymer composition may exhibit a weldline tensile strength of about 20 MPa or more, in some embodiments from about 22 to about 60 MPa, and in some embodiments, from about 25 to about 50 MPa and/or a weldline tensile modulus of 7,000 MPa or more, in some embodiments from about 7,300 MPa to about 20,000 MPa, and in some embodiments, from about 7,500 MPa to about 12,000 MPa. The weldline tensile properties may be determined at a temperature of 23° C. in accordance with ISO 527:2019. Conventionally, it was believed that a plateable polymer composition having excellent weldline tensile properties would not also possess a sufficiently low melt viscosity to so that it can readily flow into the cavity of a mold to form a small-sized component. Contrary to conventional thought, however, the polymer composition has been found to possess both excellent melt processability. For example, the polymer composition of the present invention may have an ultralow melt viscosity, such as from about 0.1 to about 80 Pa-s, in some embodiments from about 0.2 to about 50 Pa-s, in some embodiments from about 0.5 to about 40 Pa-s, and in some embodiments, from about 1 to about 35 Pa-s, determined at a shear rate of 1,000 seconds$^{-1}$ and temperature of about 15° C. greater than the melting temperature of the polymer composition in accordance with ISO 11443:2021.

The polymer composition also has excellent thermal properties. The melting temperature of the composition may, for instance, be from about 280° C. to about 400° C., in some embodiments from about 300° C. to about 380° C., and in some embodiments, from about 320° C. to about 370° C. Even at such melting temperatures, the ratio of the deflection temperature under load ("DTUL"), a measure of short term heat resistance, to the melting temperature may still remain relatively high. For example, the ratio may range from about 0.5 to about 1.00, in some embodiments from about 0.6 to about 0.95, and in some embodiments, from about 0.65 to about 0.85. The specific DTUL values may, for instance, be about 200° C. or more, in some embodiments about 220° C. or more, in some embodiments from about 230° C. to about 300° C., and in some embodiments, from about 240° C. to about 280° C. Such high DTUL values can, among other things, allow the use of high speed and reliable surface mounting processes for mating the structure with other components of the electrical component.

The polymer composition may also possess a high impact strength, which is useful when forming thin layers. The composition may, for instance, possess a Charpy notched impact strength of about 0.5 kJ/m² or more, in some embodiments from about 1 to about 60 kJ/m², in some embodiments from about 2 to about 50 kJ/m², and in some embodiments, from about 5 to about 45 kJ/m², as determined at a temperature of 23° C. in accordance with ISO 179-1:2010. The tensile and flexural mechanical properties of the composition may also be good. For example, the polymer composition may exhibit a tensile strength of from about 20 to about 500 MPa, in some embodiments from about 50 to about 400 MPa, and in some embodiments, from about 70 to about 350 MPa; a tensile break strain of about 0.4% or more, in some embodiments from about 0.5% to about 10%, and in some embodiments, from about 0.6% to about 3.5%; and/or a tensile modulus of from about 5,000 MPa to about 20,000 MPa, in some embodiments from about 8,000 MPa to about 20,000 MPa, and in some embodiments, from about 10,000 MPa to about 20,000 MPa. The tensile properties may be determined at a temperature of 23° C. in accordance with ISO 527:2019. The polymer composition may also exhibit a flexural strength of from about 20 to about 500 MPa, in some embodiments from about 50 to about 400 MPa, and in some embodiments, from about 100 to about 350 MPa; a flexural elongation of about 0.4% or more, in some embodiments from about 0.5% to about 10%, and in some embodiments, from about 0.6% to about 3.5%; and/or a flexural modulus of from about 5,000 MPa to about 20,000 MPa, in some embodiments from about 8,000 MPa to about 20,000 MPa, and in some embodiments, from about 10,000 MPa to about 15,000 MPa. The flexural properties may be determined at a temperature of 23° C. in accordance with ISO 178:2019.

As a result of the properties noted above, the polymer composition can be readily shaped into a substrate that can be subsequently plated with one or more conductive elements. Due to the beneficial properties of the polymer composition, the resulting substrate may have a very small size, such as a thickness of about 5 millimeters or less, in some embodiments about 4 millimeters or less, in some embodiments about 2 millimeters or less, and in some embodiments, from about 0.1 to about 1 millimeter. If desired, the conductive elements may be antennas (e.g., antenna resonating elements) so that the resulting part is an antenna module that may be employed in a wide variety of different electronic components, such as cellular telephones, automotive equipment, etc.

Various embodiments of the present invention will now be described in more detail.

I. Polymer Composition

A. Polymer Matrix

The polymer matrix contains one or more thermotropic liquid crystalline polymers. Liquid crystalline polymers are generally classified as "thermotropic" to the extent that they can possess a rod-like structure and exhibit a crystalline behavior in their molten state (e.g., thermotropic nematic state). The liquid crystalline polymers employed in the polymer composition typically have a melting temperature of from about 280° C. to about 400° C., in some embodiments from about 300° C. to about 380° C., and in some embodiments from about 310° C. to about 370° C. The melting temperature may be determined as is well known in the art using differential scanning calorimetry ("DSC"), such as determined by ISO 11357-3:2018. Such polymers may be formed from one or more types of repeating units as is known in the art. A liquid crystalline polymer may, for example, contain one or more aromatic ester repeating units generally represented by the following Formula (I):

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic hydroxycarboxylic repeating units, for instance, may be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 20 mol. % to about 85 mol. %, in some embodiments from about 30 mol. % to about 80 mol. %, and in some embodiments, from about 40 mol. % to 75 mol. % of the polymer.

Aromatic dicarboxylic repeating units may also be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl) ether, bis(4-carboxyphenyl)butane, bis(4-carboxyphenyl) ethane, bis(3-carboxyphenyl)ether, bis(3-carboxyphenyl) ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 1 mol. % to about 50 mol. %, in some embodiments from about 5 mol. % to about 40 mol. %, and in some embodiments, from about 10 mol. % to about 35 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 50 mol. %, in some embodiments from about 5 mol. % to about 40 mol. %, and in some embodiments, from about 10 mol. % to about 35 mol. % of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, at least one liquid crystalline polymer is typically employed in the polymer matrix that is a "low naphthenic" polymer to the extent that it contains a relatively low content of repeating units derived from naphthenic hydroxycarboxylic acids and naphthenic dicarboxylic acids, such as NDA, HNA, or combinations thereof. That is, the total amount of repeating units derived from naphthenic hydroxycarboxylic and/or dicarboxylic acids (e.g., NDA, HNA, or a combination of HNA and NDA) is typically about 20 mol. % or less, in some embodiments about 15 mol. % or less, in some embodiments from about 0.5 mol. % to about 10 mol. %, and in some embodiments, from about 1 mol. % to about 6 mol. % of the polymer. In one particular embodiment, for instance, the liquid crystalline polymer may contain repeating units derived from HNA in an amount from 0.1 mol. % to about 10 mol. %, in some embodiments from about 0.5 mol. % to about 8 mol. %, and in some embodiments, from about 1 mol. % to about 6 mol. %. The liquid crystalline polymer may also contain various other monomers. For example, the polymer may contain repeating units derived from HBA in an amount of from about 40 mol. % to about 80 mol. %, and in some embodiments from about 50 mol. % to about 75 mol. %, and in some embodiments, from about 55 mol. % to about 70 mol. %. When employed, the molar ratio of repeating units derived from HBA to the repeating units derived from HNA may be selectively controlled within a specific range to help achieve the desired properties, such as from about 5 to about 40, in some embodiments from about 8 to about 35, and in some embodiments, from about 10 to about 30. The polymer may also contain repeating units derived from aromatic dicarboxylic acid(s) (e.g., IA and/or TA) in an amount of from about 10 mol. % to about 40 mol. %, and in some embodiments, from about 15 mol. % to about 30 mol. %; aromatic diol(s) (e.g., BP and/or HQ) in an amount of from about 5 mol. % to about 30 mol. %, and in some embodiments, from about 10 mol. % to about 20 mol. %; and/or aromatic amides (e.g., acetaminophen ("APAP")) in an amount of from about 1 mol. % to about 10 mol. %, and in some embodiments, from about 2 mol. % to about 8 mol. %.

Regardless of the particular constituents and nature of the polymer, the liquid crystalline polymer may be prepared by initially introducing the aromatic monomer(s) used to form the ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 200° C. to about 400° C. For instance, one suitable technique for forming the aromatic polyester may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to from about 200° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. In some embodiments, the melt polymerized polymer may also be subjected to a subsequent solid-state polymerization method to further increase its molecular weight. Solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of from about 200° C. to about 400° C. The polymerization time will of course vary based on the temperature and target molecular weight. In most cases, however, the solid-state polymerization time will be from about 2 to about 12 hours, and in some embodiments, from about 4 to about 10 hours.

The total amount of liquid crystalline polymers employed in the polymer composition is typically from about 40 wt. % to about 90 wt. %, in some embodiments from about 45 wt. % to about 80 wt. %, and in some embodiments, from about 50 wt. % to about 70 wt. % of the entire polymer composition. In certain embodiments, all of the liquid crystalline polymers are "low naphthenic" polymers such as described above. In other embodiments, however, "high naphthenic" liquid crystalline polymers may also be employed in the composition in which the total amount of repeating units derived from naphthenic hydroxycarboxylic and/or dicarboxylic acids (e.g., NDA, HNA, or a combination of HNA and NDA) may be about 10 mol. % or more, in some embodiments about 15 mol. % or more, and in some embodiments, from about 20 mol. % to about 75 mol. % of the polymer. When employed, it is generally desired that such high naphthenic polymers are present in only a relatively low amount. For example, when employed, high naphthenic liquid crystalline polymers typically constitute from about 1 wt. % to about 50 wt. %, in some embodiments from about 10 wt. % to about 45 wt. %, and in some embodiments, from about 20 wt. % to about 40 wt. % of the total amount of liquid crystalline polymers in the composition, and from about 0.5 wt. % to about 45 wt. %, in some embodiments from about 2 wt. % to about 35 wt. %, and in some embodiments, from about 5 wt. % to about 25 wt. % of the entire composition. Conversely, low naphthenic liquid crystalline polymers typically constitute from about 50 wt. % to about 99 wt. %, in some embodiments from about 55 wt. % to about 95 wt. %, and in some embodiments, from about 60 wt. % to about 90 wt. % of the total amount of liquid crystalline polymers in the composition, and from about 25 wt. % to about 65 wt. %, in some embodiments from about 30 wt. % to about 60 wt. %, and in some embodiments, from about 35 wt. % to about 55 wt. % of the entire composition.

B. Silicate Fibers

As noted, the polymer composition contains silicate fibers distributed within the polymer matrix, typically in an amount of from about 10 parts to about 80 parts by weight, in some embodiments from about 15 parts to about 70 parts by weight, and in some embodiments, from about 30 parts to about 55 parts by weight per 100 parts by weight of the polymer matrix. For example, the silicate fibers may constitute from about 10 wt. % to about 60 wt. %, in some embodiments from about 15 wt. % to about 45 wt. %, and in some embodiments, from about 20 wt. % to about 40 wt. % of the polymer composition. The silicate fibers may be derived from neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc. Particularly suitable are silicate fibers having a hardness value of about 2.0 or more, in some embodiments about 2.5 or more, in some embodiments about 3.0 or more, in some embodiments from about 3.0 to about 11.0, in some embodiments from about 3.5 to about 11.0, and in some embodiments, from about 4.5 to about 6.5 based on the Mohs hardness scale. Examples of such fibers include those derived from inosilicates, such as wollastonite (Mohs hardness of 4.5 to 5.0), which are commercially available from Nyco Minerals under the trade designation Nyglos® (e.g., Nyglos® 4W or Nyglos® 8).

The silicate fibers may have a median diameter of from about 1 to about 35 micrometers, in some embodiments from about 2 to about 20 micrometers, in some embodiments from about 3 to about 15 micrometers, and in some embodiments, from about 7 to about 12 micrometers. The silicate fibers may also have a narrow size distribution. That is, at least about 60% by volume of the fibers, in some embodiments at least about 70% by volume of the fibers, and in some embodiments, at least about 80% by volume of the fibers may have a size within the ranges noted above. In addition to possessing the size characteristics noted above, the silicate fibers may also have a relatively high aspect ratio (average length divided by median width) to help further improve the mechanical properties and surface quality of the resulting polymer composition. For example, the silicate fibers may have an aspect ratio of from about 2 to about 50, in some embodiments from about 2 to about 40, in some embodiments from about 3 to about 20, and in some embodiments, from about 4 to about 15. The volume average length of such fibers may, for example, range from about 1 to about 200 micrometers, in some embodiments from about 2 to about 150 micrometers, in some embodiments from about 5 to about 100 micrometers, and in some embodiments, from about 10 to about 50 micrometers.

C. Optional Additives
i. Plating Additives

If desired, the polymer composition may contain a plating additive to help facilitate subsequent plating of the composition. In one embodiment, for example, the polymer composition may contain an additive that can be activated by a laser direct structuring ("LDS") process. In such a process, the additive is exposed to a laser that causes the release of metals. The laser thus draws the pattern of conductive elements onto the part and leaves behind a roughened surface containing embedded metal particles. These particles act as nuclei for the crystal growth during a subsequent plating process (e.g., copper plating, gold plating, nickel plating, silver plating, zinc plating, tin plating, etc.). When employed, laser activatable additives typically constitute from about 0.1 wt. % to about 20 wt. %, in some embodiments from about 0.5 wt. % to about 15 wt. %, and in some embodiments, from about 1 wt. % to about 10 wt. % of the polymer composition. The laser activatable additive generally includes spinel crystals, which may include two or more metal oxide cluster configurations within a definable crystal formation. For example, the overall crystal formation may have the following general formula:

$$AB_2O_4$$

wherein,
A is a metal cation having a valance of 2, such as cadmium, chromium, manganese, nickel, zinc, copper, cobalt, iron, magnesium, tin, titanium, etc., as well as combinations thereof; and
B is a metal cation having a valance of 3, such as chromium, iron, aluminum, nickel, manganese, tin, etc., as well as combinations thereof.

Typically, A in the formula above provides the primary cation component of a first metal oxide cluster and B provides the primary cation component of a second metal oxide cluster. These oxide clusters may have the same or different structures. In one embodiment, for example, the first metal oxide cluster has a tetrahedral structure and the second metal oxide cluster has an octahedral cluster. Regardless, the clusters may together provide a singular identifiable crystal type structure having heightened susceptibility to electromagnetic radiation. Examples of suitable spinel crystals include, for instance, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$, $MgCr_2O_4$, etc. Copper chromium oxide ($CuCr_2O_4$) is particularly suitable for use in the present invention and is available from Shepherd Color Co. under the designation "Shepherd Black 1GM."

Of course, other types of plating additives may also be employed. In one embodiment, for instance, the plating additive may include a noble metal catalyst, which contains a noble metal component, such as those selected from Groups IB, VIIA and VIIIA of the Periodic Table (IUPAC Table), generally with atomic weights of at least 100, Examples of such noble metal components include palladium, ruthenium, rhodium, iridium, platinum, as well as alloys or combinations of any of the foregoing. Palladium is particularly suitable. To help improve the physical strength of the catalyst, the noble metal component is also typically supported by a matrix material, such as an inorganic metal oxide. Suitable inorganic metal oxides for this purpose may include, for instance, silica, alumina, silica-alumina, magnesia, silica-magnesia, silica-zirconia, silica-thoria, silica-beryllia, silica-titanic, silica-alumina-thoria, silica-alumina-zirconia, silica-alumina-magnesia, silia-magnesia-zirconia, halloysite, kaolinite, illite, montmorillonite, vermiculite, palygorskite, pyrophyllite, calcium silicate, aluminum silicate, wollastonite, etc. Natural and/or synthetic silicates mineral, such as kaolinite, are particularly suitable. The matrix material may be combined with the noble metal component in a variety of ways, such as impregnation or ion exchange (or both), using solutions of simple or complex ions of the chosen metal component (e.g., complex cations, such as $Pd(NH_3)_4^{2+}$), The complex can be converted to the catalytically active form during subsequent treatment steps, such as calcination or reduction e.g. in hydrogen. Alternatively, a compound of the selected noble metal component may simply be added to the matrix material as it is formed into particles, such as by extrusion or pelletizing.

The overall amount of catalyst employed in the polymer composition is generally such that the noble metal component constitutes from about 0.1 parts to about 6 parts by weight, in some embodiments from about 0.2 parts to about 4 parts by weight, and in some embodiments, from about 0.5 parts to about 2.5 parts by weight per 100 parts by weight of the polymer matrix. For example, the noble metal component may constitute from about 0.1 wt. % to about 5 wt. %, in some embodiments from about 0.2 wt. % to about 3 wt. %, and in some embodiments, from about 0.4 wt. % to about 1.5 wt. % of the polymer composition. The actual amount of catalyst employed in the composition thus depends on the amount of the noble metal component employed within the catalyst. Typically, the noble metal component constitutes from about 0.01 wt. % to about 3 wt. % in some embodiments from about 0.05 wt. % to about 1 wt. %, and in some embodiments, from about 0.1 wt. % to about 0.8 wt. % of the catalyst. In such embodiments, the catalyst constitutes from about 0.5 parts to about 20 parts by weight, in some embodiments from about 1 part to about 15 parts by weight, and in some embodiments, from about 2 parts to about 10 parts by weight per 100 parts by weight of the polymer matrix. For example, the catalyst may constitute from about 0.1 wt. % to about 15 wt. %, in some embodiments from about 0.5 wt. % to about 10 wt. %, and in some embodiments, from about 1 wt. % to about 6 wt. % of the polymer composition.

ii. Mineral Particles

If desired, mineral particles may also be employed in the polymer composition. When employed, the mineral particles are typically formed from a material having a hardness value such as noted above. Any of a variety of different types of mineral particles may generally be employed in the polymer composition, such as those formed from a natural and/or synthetic silicate mineral, such as talc, mica, silica (e.g., amorphous silica), alumina, halloysite, kaolinite, illite, montmorillonite, vermiculite, palygorskite, pyrophyllite, calcium silicate, aluminum silicate, wollastonite, etc.; sulfates; carbonates; phosphates; fluorides, borates; and so forth. Particularly suitable are particles having the desired hardness value, such as calcium carbonate ($CaCO_3$, Mohs hardness of 3.0), copper carbonate hydroxide ($Cu_2CO_3(OH)_2$, Mohs hardness of 4.0); calcium fluoride ($CaFl_2$, Mohs hardness of 4.0); calcium pyrophosphate (($Ca_2P_2O_7$, Mohs hardness of 5.0), anhydrous dicalcium phosphate ($CaHPO_4$, Mohs hardness of 3.5), hydrated aluminum phosphate ($AlPO_4 \cdot 2H_2O$, Mohs hardness of 4.5); silica ($SiO_2$, Mohs hardness of 5.0-6.0), potassium aluminum silicate ($KAlSi_3O_8$, Mohs hardness of 6), copper silicate ($CuSiO_3 \cdot H_2O$, Mohs hardness of 5.0); calcium borosilicate hydroxide ($Ca_2B_5SiO_9(OH)_5$, Mohs hardness of 3.5); alumina ($AlO_2$, Mohs hardness of 10.0); calcium sulfate ($CaSO_4$, Mohs hardness of 3.5), barium sulfate ($BaSO_4$, Mohs hardness of from 3 to 3.5), mica (Mohs hardness of 2.5-5.3), and so forth, as well as combinations thereof.

In certain embodiments, it may be desirable to employ mineral particles that are "flake-shaped" to improve the surface and mechanical properties of the composition. In such embodiments, the particles generally have a relatively high aspect ratio (e.g., average diameter divided by average thickness), such as about 4 or more, in some embodiments about 10 or more, and in some embodiments, from about 40 to about 250. The average diameter of the particles may, for example, range from about 5 micrometers to about 200 micrometers, in some embodiments from about 8 micrometers to about 150 micrometers, and in some embodiments, from about 10 micrometers to about 100 micrometers, such as determined using laser diffraction techniques in accordance with ISO 13320:2009 (e.g., with a Horiba LA-960 particle size distribution analyzer). The average thickness may likewise be about 2 micrometers or less, in some embodiments from about 5 nanometers to about 1 micrometer, and in some embodiments, from about 20 nanometers to about 500 nanometers. The flake-shaped particles are typically formed from a natural and/or synthetic silicate mineral, such as mica, halloysite, kaolinite, illite, montmorillonite, vermiculite, palygorskite, pyrophyllite, calcium silicate, aluminum silicate, wollastonite, etc. Mica, for instance, is particularly suitable. Any form of mica may generally be employed, including, for instance, muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc. Muscovite-based mica is particularly suitable for use in the polymer composition.

Of course, in other embodiments, the mineral particles may have a shape that is generally granular or nodular in nature. In such embodiments, the particles may have a median size (e.g., diameter) of from about 0.5 to about 20 micrometers, in some embodiments from about 1 to about 15 micrometers, in some embodiments from about 1.5 to about 10 micrometers, and in some embodiments, from about 2 to about 8 micrometers, such as determined using laser diffraction techniques in accordance with ISO 13320:2009 (e.g., with a Horiba LA-960 particle size distribution analyzer). Examples of such granular particles may include, for instance, barium sulfate.

iii. Glass Fibers

One beneficial aspect of the present invention is that good strength properties may be achieved without adversely impacting the surface properties of the resulting part. To help ensure that such properties are maintained, it is generally desirable that the polymer composition remains substantially free of conventional fibrous fillers, such as glass fibers. Thus, if employed at all, glass fibers typically constitute no more than about 10 wt. %, in some embodiments no more than about 5 wt. %, and in some embodiments, from about 0.001 wt. % to about 3 wt. % of the polymer composition.

iv. Other Additives

A wide variety of other additional additives can also be included in the polymer composition, such as lubricants, electrically conductive fillers (e.g., carbon fibers, carbon nanotubes, graphite, ionic liquids, etc.), thermally conductive fillers (e.g., carbon black, graphite, boron nitride, etc.), pigments, antioxidants, stabilizers, surfactants, waxes, flame retardants, anti-drip additives, nucleating agents (e.g., boron nitride), tribological agents (e.g., fluoropolymers), and other materials added to enhance properties and processability. Lubricants, for example, may be employed in the polymer composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinaric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

II. Formation

The components used to form the polymer composition may be combined together using any of a variety of different techniques as is known in the art. In one particular embodiment, for example, the liquid crystalline polymer, silicate fibers, and other optional additives are melt processed as a mixture within an extruder to form the polymer composition. The mixture may be melt-kneaded in a single-screw or multi-screw extruder at a temperature of from about 250° C. to about 450° C. In one embodiment, the mixture may be melt processed in an extruder that includes multiple temperature zones. The temperature of individual zones is typically set within about −60° C. to about 25° C. relative to the melting temperature of the liquid crystalline polymer. By way of example, the mixture may be melt processed using a twin screw extruder such as a Leistritz 18-mm co-rotating fully intermeshing twin screw extruder. A general purpose screw design can be used to melt process the mixture. In one embodiment, the mixture including all of the components may be fed to the feed throat in the first barrel by means of a volumetric feeder. In another embodiment, different components may be added at different addition points in the extruder, as is known. For example, the liquid crystalline polymer may be applied at the feed throat, and certain additives (e.g., noble metal catalyst) may be supplied at the same or different temperature zone located downstream therefrom. Regardless, the resulting mixture can be melted and mixed then extruded through a die. The extruded polymer composition can then be quenched in a water bath to solidify and granulated in a pelletizer followed by drying.

III. Antenna Module

As indicated above, the antenna module generally contains at least one component that includes a substrate on which is plated a metal coating. In certain cases, the metal coating may form an interconnect pattern, such as those formed from antenna elements (e.g., antenna resonating elements). The conductive elements can form antennas of a variety of different types, such as antennae with resonating elements that are formed from patch antenna elements, inverted-F antenna elements, closed and open slot antenna elements, loop antenna elements, monopoles, dipoles, planar inverted-F antenna elements, hybrids of these designs, etc.

The substrate may be formed using a variety of different molding techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, insert molding, pin-insert molding, etc. For example, an injection molding system may be employed that includes a mold within which the polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

The metal coating may be plated on the substrate using any of a variety of known plating techniques, such as electrolytic plating, electroless plating, digital printing, aerosol jet printing, and so forth. The metal coating may contain one or more of a variety of conductive materials, such as a metal, e.g. gold, silver, nickel, aluminum, copper, as well as mixture or alloys thereof. In one embodiment, for instance, the metal coating may include copper and/or nickel (e.g., pure or alloys thereof). If desired, a seed layer may initially be formed on the substrate to facilitate the plating process. The method for forming the desired interconnect pattern may vary as is known to those skilled in the art. For example, in certain cases, a pattern may initially be formed on the surface of the substrate based on the desired circuit interconnect pattern. This may be accomplished using various known techniques, such as laser ablation or patterning, plasma etching, ultraviolet light treatment, acid etching, etc. After it is formed, the resulting interconnect pattern may then be plated with the desired conductive elements. In other cases, however, a surface of the substrate (e.g., entire surface) may be plated and then subsequently ablated using techniques such as referenced above to form the desired interconnect pattern. In one embodiment, for instance, the plated surface may be laser ablated to form the desired interconnect pattern.

Regardless of the method employed, the manner in which the surface is plated may also be selected based on techniques known in the art. In one embodiment, for instance, a surface of the substrate may be contacted with an activation solution that contains a noble metal, such as palladium, platinum, iridium, rhodium, etc., as well as mixtures thereof. Palladium is particularly suitable. When employed, the presence of a noble metal catalyst plating additive within the polymer composition can help improve the adhesion of the activation solution to the substrate for subsequent plating operations. Of course, in certain cases, the noble metal catalyst itself may serve as the activation agent such that a subsequent solution is not required. In any event, after any optional activation steps, a first metal layer may be formed thereon on the substrate, such as through a electroless and/or electrolytic plating. Electroless plating may occur through auto-catalytic reactions in which the metal deposited on the surface acts as a catalyst for further depositing. Typically, nickel and/or copper are electrolessly plated onto the surface of the substrate. Electroless nickel plating may be accomplished, for example, using a solution that contains a nickel salt (e.g., nickel sulfate). Electrolytic plating may also be employed during which the substrate is contacted with a metal solution and subjected to an electrical current to initiate deposition of the metal. If desired, the surface of the substrate may be roughened prior to being plated using a variety of known techniques, such as laser ablation, plasma etching, ultraviolet light treatment, fluorination, etc. Among other things, such roughening helps facilitating plating in the desired interconnect pattern. Further, the substrate may also be subjected to one or more additional steps to form the final metal coating layer(s). For example, a second metal layer may be electrolytically deposited over the first metal layer (e.g., electrolytically and/or electrolessly plated copper and/ or nickel). The second metal layer may include, for instance, copper or nickel. In certain embodiments, one or more additional metal layer(s), such as copper and/or nickel, may also be electrolytically deposited over the second metal layer.

The antenna module may have a variety of different configurations. In one particular embodiment, for example, the antenna module may contain a shield member that is configured to cover a communication circuit and a dielectric on which is disposed one or more antenna elements. The shield member may contain a substrate on which a metal coating is plated. If desired, the dielectric and/or the substrate of the shield member may contain the polymer composition of the present invention. In certain embodiments, an interconnect member may also be employed in the antenna module that is electrically connected with the communication circuit and the antenna element(s). The interconnect member may likewise contain a substrate on which a metal coating is plated. If desired, the substrate of the interconnect member may contain the polymer composition of the present invention. One benefit of employing the polymer composition for such components (e.g., dielectric and substrate of the interconnect member) is that the use of silicate fibers of a certain size and/or shape can ensure that they do not substantially extend from a surface of the component. In this manner, the silicate fibers from one component do not contact the metal coating of another component, which may otherwise cause a short in the electrical connection.

Referring to FIGS. 1-4, for example, one example of such an antenna module 1 is shown in more detail. As shown, the antenna module 1 includes a circuit device 93 disposed on a substrate 91; a communication circuit 94 for processing a radio signal; and a cover member 11 covering the communication circuit 94. The cover member 11 may be disposed on the substrate 91 to cover all or substantially all of the front surface of the substrate 91 (surface on the side of the positive area in −z axis). A conductive line (not shown) may be electrically connected to the circuit device 93, which is a component of the communication circuit 94. A connection pad 95 may likewise be formed on the rear surface (surface on the side of the negative area in −z axis) of the substrate 91. The connection pad 95 may be used for electrically connecting the antenna module 1 with each part of a device to be mounted. The cover member 11 may contain a dielectric 12 on which is disposed an antenna element 51 for transmitting and receiving a radiofrequency signal. The dielectric 12 covers at least a portion of a shield member 71, which may optionally include a conductive metal, such as an aluminum alloy or a copper alloy. For convenience, the dielectric 12 is independently shown in FIG. 2; however, it should be understood that the dielectric 12 may be formed as an integral member with the shield member 71 (e.g., insert molding).

Figure 1:
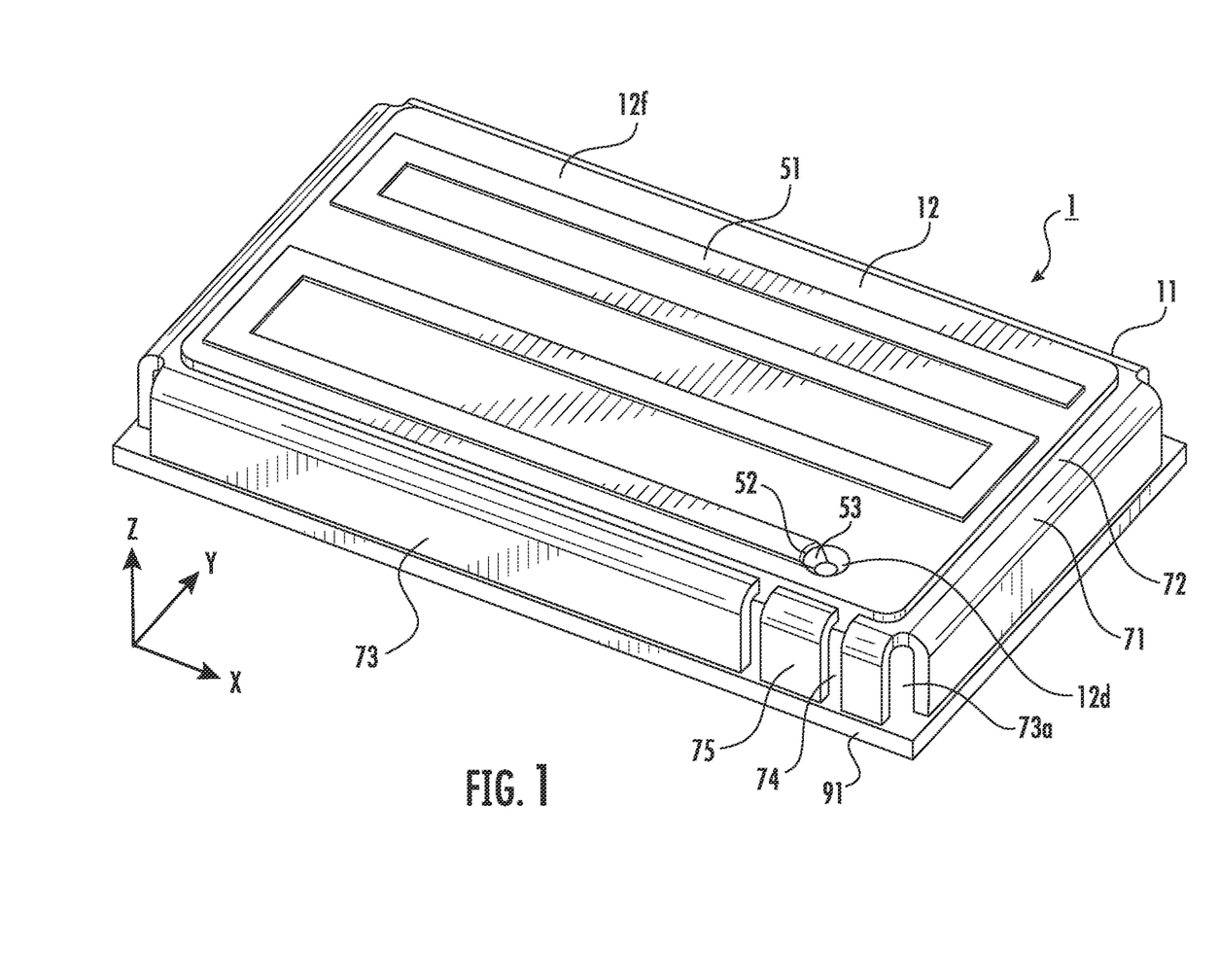
FIG. 1 is a perspective view of an antenna module in accordance with one embodiment of the present invention.
Figure 2:
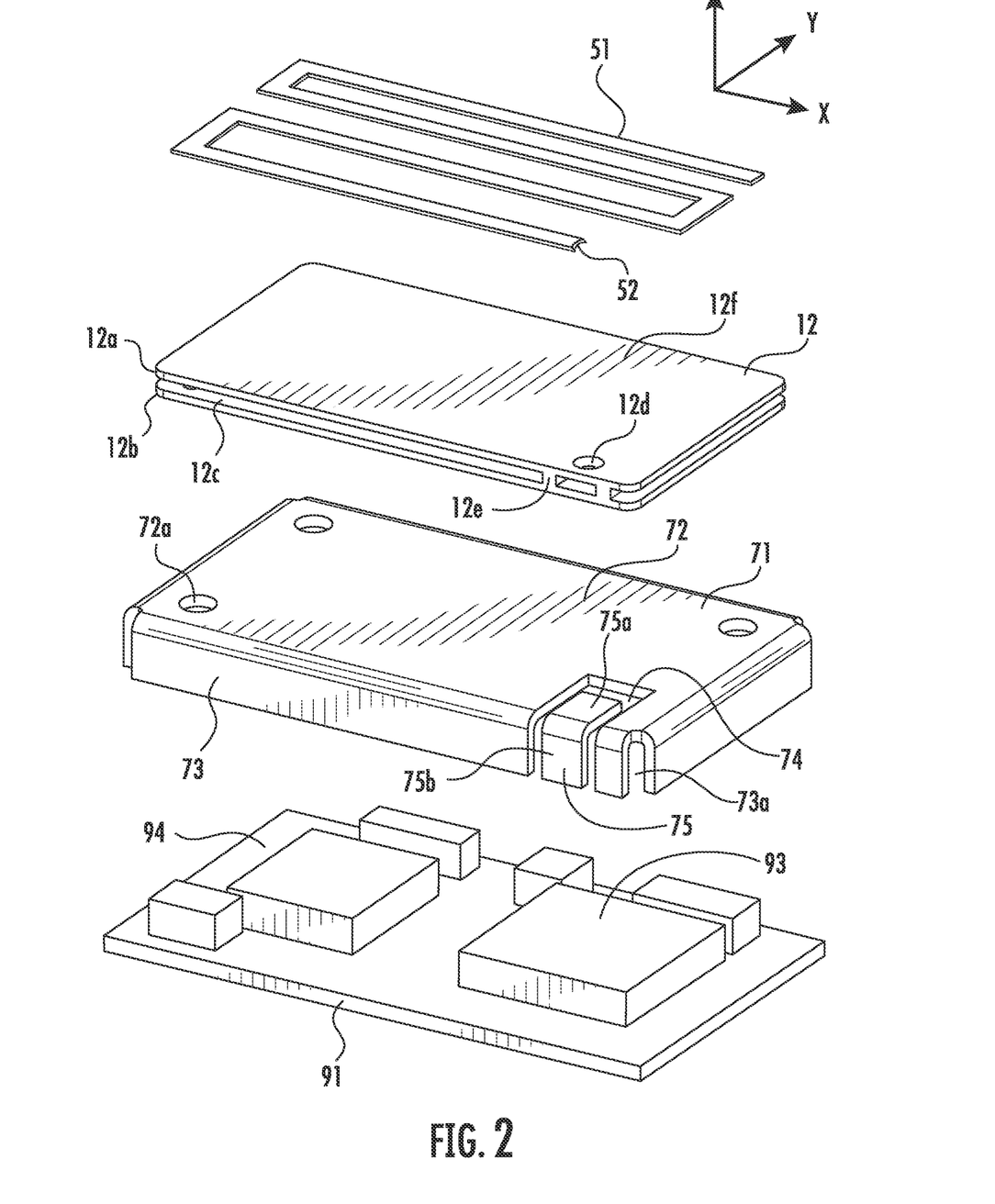
FIG. 2 is an exploded view of the antenna module shown in FIG. 1.
Figures 3A, 3C, 3D:
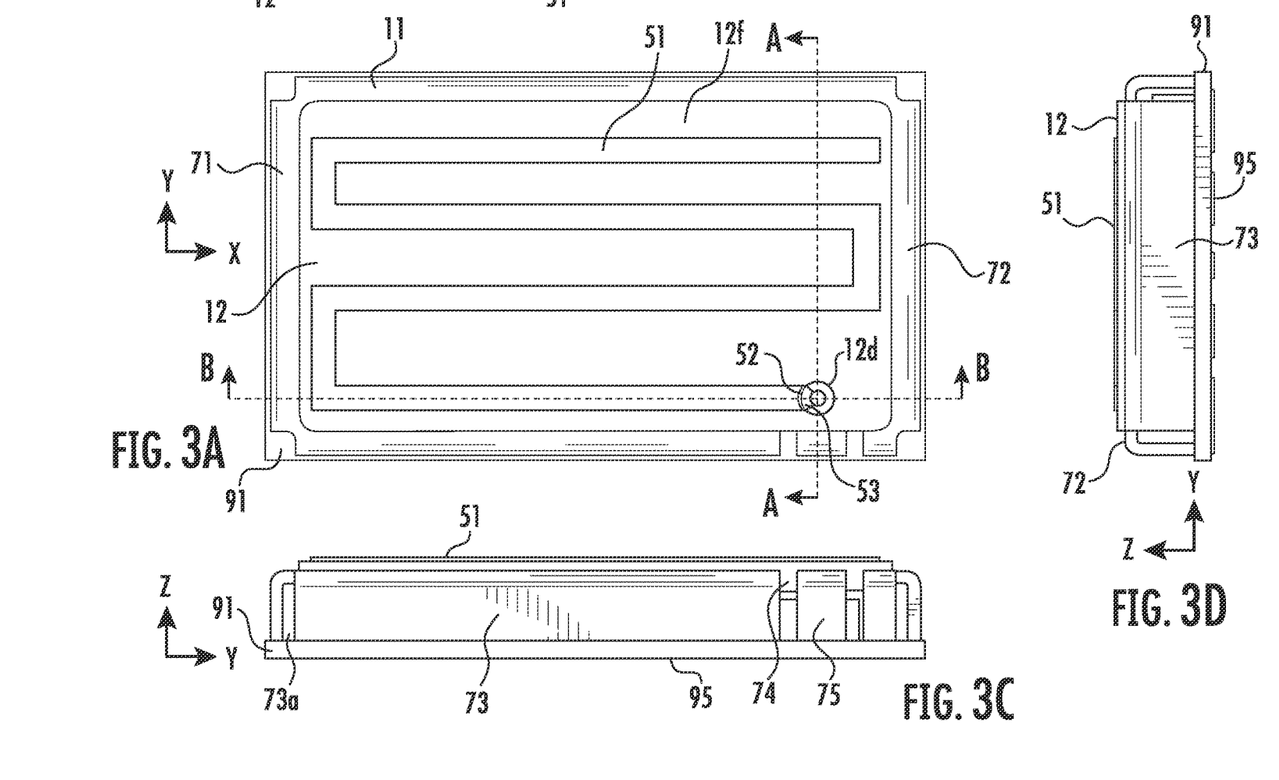
Figure 3B:
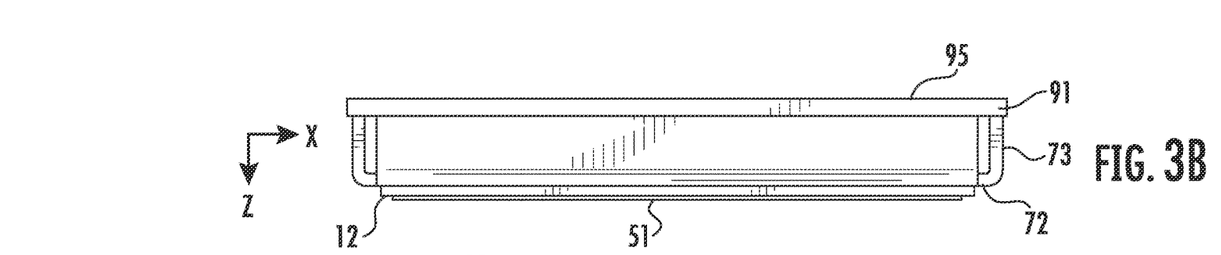
FIG. 3B is a rear view.

The shield member 71 in the illustrated embodiment contains a top panel 72 that is a planer member having four side panels 73 extending downwardly (in the negative direction in −z axis) therefrom. Although not required, adjacent side panels 73 may be spaced apart from each other to form a corner aperture 73a. Likewise, one or more openings 72a may likewise be formed in the top panel 72 that act as through-holes. When the dielectric 12 is formed, a connection part 12e connecting between an upper panel 12a and a lower panel 12b of the dielectric 12 is formed in the opening by passing the resin as the raw material through the opening.

A notch 74 may also be formed on the shield member 71. A interconnect member 75 may likewise be arranged in the notch 74 without contacting the shield member 71. For instance, the notch 74 and the interconnect member 75 may be arranged at a site adjacent to the one end of the long side line (the left end in FIG. 3B) of the top panel 72. The notch 74 may be formed so as to extend from a site near the side line corresponding to the long line of the top panel 72 to the side line and to extend from the side line to the bottom end of the side panel 73, and to open in the bottom end. The interconnect member 75 may have an elongated planer shape and bended generally at right angle. The contour of the interconnect member 75 may be similar in shape to the shape of the notch 74, and the dimension of the contour may be formed so as to be smaller than that of the notch 74. As shown, the interconnect member 75 has an upper part 75a that is generally disposed coplanar with the top panel 72 and a side part 75b that is generally disposed coplanar with the side panel 73. The connection part 12e of the dielectric 12 may thus be formed into the notch 74 surrounding the upper part 75a. If desired, the interconnect member 75 and the shield member 71 may be formed integrally with the dielectric 12 (e.g., by insert molding). In such embodiments, the interconnect member 75 and/or the shield member 71 may contain a substrate, which can be formed from the polymer composition of the present invention, which is plated to form a conductive surface. Regardless, at least one of the upper parts 75a is buried in the dielectric 12 and electrically connected to the antenna element 51.

The upper panel 12a of the dielectric 12 is positioned outside the shield member 71 and covers almost entirely all of the upper surface of the top panel 72. Likewise, the lower panel 12b of the dielectric 12 is positioned inside the shield member 71 and covers almost entirely all of the lower surface of the top panel 72. The connection part 12e of the dielectric 12 connects between the upper panel 12a and the lower panel 12b, and a housing recess 12c is spaced between the upper panel 12a and the lower panel 12b for housing the top panel 72. A communication opening 12d is also formed that penetrates through the upper panel 12a in the thickness direction on the corresponding site of the upper part 75a of the interconnect member 75 on the upper panel 12a. The communication opening 12d is a tapered opening having a downwardly decreasing diameter, which is positioned over the upper part 75a of the interconnect member 75 and opened toward the upper surface 12f and the lower surface of the upper panel 12a. In this manner, the upper surface of the upper part 75a is exposed to the outside of the cover member 11. In the example shown in the figure, a thorough-hole is formed on the lower panel 12b at a site corresponding to the communication opening 12d, but the thorough-hole may be suitably omitted.

Figure 4A:
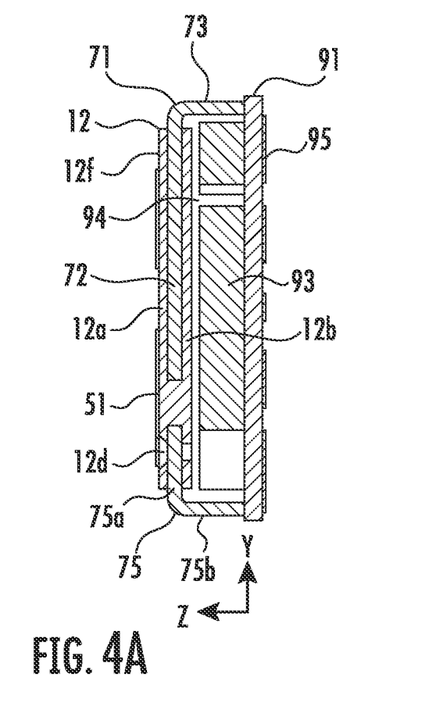
FIG. 4A is a cross-sectional view of the antenna module taken along a line A-A of FIG. 3A
Figure 4B:
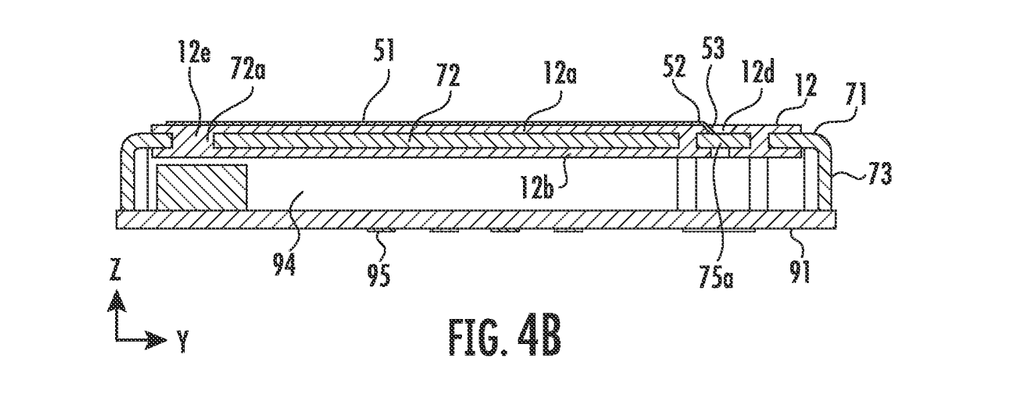
FIG. 4B is a cross-sectional view of the antenna module taken along the line B-B of FIG. 3A.

As noted above, an antenna element 51 is disposed on the outer surface of the dielectric 12, i.e., the upper surface 12f of the upper panel 12a. In the illustrated embodiment, the antenna element 51 has a serpentine shape in the planar view. One end of the antenna element 51 is contacted with the edge of the communication opening 12d as the connection end 52, and the connection end 52 is electrically connected with the upper surface of the upper part 75a of the interconnect member 75 via the communication pattern 53 arranged on the side surface of the communication opening 12d. The antenna element 51 may be plated onto the upper surface 12f of the upper panel 12a in a matter such as described above (e.g., electroless and/or electrolytic plating). The cover member 11 may likewise be attached to the surface of the substrate 91 by soldering the lower end of the side panel 73 of the shield member 71 on a connection pad (not shown) of the surface of the substrate 91. In this manner, the communication circuit 94 and the circuit 93 are positioned within the box-shaped or container-shaped shield member 71, as shown in FIGS. 4A and 4B. At least a portion of the lower end in the side panel 73 of the shield member 71 may also be contacted with a conductive line (not shown) formed on the surface of the substrate 91. The lower end of the side part 75b of the interconnect member 75 is a conductive line for a signal (not shown) formed on the surface of the substrate 91, and is connected to a conductive line contained in the communication circuit 94. Thus, because the antenna element 51 is connected with the communication circuit 94 via the communication pattern 53 and the interconnect member 75, the antenna element 51 can transfer and receive a radiofrequency signal.

Any of the components of the antenna module 1 described above may generally contain the polymer composition of the present invention. For example, the polymer composition may be employed in the substrate 91, the cover member 11 (e.g., the dielectric 12, shield member 71, interconnect member 75, etc.), and so forth. In one embodiment, for example, the dielectric 12 may contain the polymer composition of the present invention and contain a metal coating that is plated thereon in a manner as described above. If desired, the interconnect member 75 may also contain the polymer composition of the present invention and contain a metal coating that is plated thereon in a manner as described above. As noted above, one benefit of employing the polymer composition for such components is that the silicate fibers from one component do not contact the metal coating of another component, which may otherwise cause a short in the electrical connection.

In certain embodiments, an antenna module containing the polymer composition of the present invention may be particularly well suited for use in high frequency antennas and antenna arrays for use in base stations, repeaters (e.g., "femtocells"), relay stations, terminals, user devices, and/or other suitable components of 5G systems. As used herein, "5G" generally refers to high speed data communication over radio frequency signals. 5G networks and systems are capable of communicating data at much faster rates than previous generations of data communication standards (e.g., "4G, "LTE"). For example, as used herein, "5G frequencies" can refer to frequencies that are 1.5 GHz or more, in some embodiments about 2.0 GHz or more, in some embodiments about 2.5 GHz or higher, in some embodiments about 3.0 GHz or higher, in some embodiments from about 3 GHz to about 300 GHz, or higher, in some embodiments from about 4 GHz to about 80 GHz, in some embodiments from about 5 GHz to about 80 GHz, in some embodiments from about 20 GHz to about 80 GHz, and in some embodiments from about 28 GHz to about 60 GHz. Various standards and specifications have been released quantifying the requirements of 5G communications. As one example, the International Telecommunications Union (ITU) released the International Mobile Telecommunications-2020 ("IMT-2020") standard in 2015. The IMT-2020 standard specifies various data transmission criteria (e.g., downlink and uplink data rate, latency, etc.) for 5G. The IMT-2020 Standard defines uplink and downlink peak data rates as the minimum data rates for uploading and downloading data that a 5G system must support. The IMT-2020 standard sets the downlink peak data rate requirement as 20 Gbit/s and the uplink peak data rate as 10 Gbit/s. As another example, $3^{rd}$ Generation Partnership Project (3GPP) recently released new standards for 5G, referred to as "5G NR." 3GPP published "Release 15" in 2018 defining "Phase 1" for standardization of 5G NR. 3GPP defines 5G frequency bands generally as "Frequency Range 1" (FR1) including sub-6 GHz frequencies and "Frequency Range 2" (FR2) as frequency bands ranging from 20-60 GHz. Antenna modules described herein can satisfy or qualify as "5G" under standards released by 3GPP, such as Release 15 (2018), and/or the IMT-2020 Standard.

To achieve high speed data communication at high frequencies, antenna elements and arrays may employ small feature sizes/spacing (e.g., fine pitch technology) that can improve antenna performance. For example, the feature size (spacing between antenna elements, width of antenna elements) etc. is generally dependent on the wavelength ("λ") of the desired transmission and/or reception radio frequency propagating through the substrate dielectric on which the antenna element is formed (e.g., nλ/4 where n is an integer). Further, beamforming and/or beam steering can be employed to facilitate receiving and transmitting across multiple frequency ranges or channels (e.g., multiple-in-multiple-out (MIMO), massive MIMO).

The high frequency 5G antenna elements can have a variety of configurations. For example, the 5G antenna elements can be or include coplanar waveguide elements, patch arrays (e.g., mesh-grid patch arrays), other suitable 5G antenna configurations. The antenna elements can be configured to provide MIMO, massive MIMO functionality, beam steering, and the like. As used herein "massive" MIMO functionality generally refers to providing a large number transmission and receiving channels with an antenna array, for example 8 transmission (Tx) and 8 receive (Rx) channels (abbreviated as 8×8). Massive MIMO functionality may be provided with 8×8, 12×12, 16×16, 32×32, 64×64, or greater.

The antenna elements can have a variety of configurations and arrangements and can be fabricated using a variety of manufacturing techniques. As one example, the antenna elements and/or associated elements (e.g., ground elements, feed lines, etc.) can employ fine pitch technology. Fine pitch technology generally refers to small or fine spacing between their components or leads. For example, feature size/dimensions and/or spacing between antenna elements (or between an antenna element and a ground plane) can be about 5,000 micrometers or less, in some embodiments about 3,000 micrometers or less, in some embodiments 1,500 micrometers or less, in some embodiments 750 micrometers or less (e.g., center-to-center spacing of 1.5 mm or less), 650 micrometers or less, in some embodiments 550 micrometers or less, in some embodiments 450 micrometers or less, in some embodiments 350 micrometers or less, in some embodiments 250 micrometers or less, in some embodiments 150 micrometers or less, in some embodiments 100 micrometers or less, and in some embodiments 50 micrometers or less. However, it should be understood that feature sizes and/or spacings that are smaller and/or larger may be employed within the scope of this disclosure.

As a result of such small feature dimensions, antenna modules can be achieved with a large number of antenna elements in a small footprint. For example, an antenna array can have an average antenna element concentration of greater than 10 antenna elements per square centimeter, in some embodiments greater than 50 antenna elements per square centimeter, in some embodiments greater than 200 antenna elements per square centimeter, in some embodiments greater than 1,000 antenna elements per square centimeter, in some embodiments greater than 3,000 antenna elements per square centimeter, and in some embodiments greater than about 5,000 antenna elements per square centimeter. Such compact arrangement of antenna elements can provide a greater number of channels for MIMO functionality per unit area of the antenna area. For example, the number of channels can correspond with (e.g., be equal to or proportional with) the number of antenna elements.

Regardless of its particular configuration, the antenna module can be employed in a variety of different electronic components. As an example, the antenna module may be formed in electronic components, such as desktop computers, portable computers, handheld electronic devices, automotive equipment, etc. In one suitable configuration, the antenna module is formed in the housing of a relatively compact portable electronic component in which the available interior space is relatively small. Examples of suitable portable electronic components include cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, etc. The antenna could also be integrated with other components such as camera module, speaker or battery cover of a handheld device.

The present invention may be better understood with reference to the following examples.

Test Methods

Melt Viscosity: The melt viscosity (Pa-s) may be determined in accordance with ISO 11443:2021 at a shear rate of 400 $s^{-1}$ or 1,000 $s^{-1}$ and temperature 15° C. above the melting temperature (e.g., about 325° C.) using a Dynisco LCR7001 capillary rheometer. The rheometer orifice (die) may have a diameter of 1 mm, length of 20 mm, L/D ratio of 20.1, and an entrance angle of 180°. The diameter of the barrel may be 9.55 mm+0.005 mm and the length of the rod may be 233.4 mm.

Melting Temperature: The melting temperature ("Tm") may be determined by differential scanning calorimetry ("DSC") as is known in the art. The melting temperature is the differential scanning calorimetry (DSC) peak melt temperature as determined by ISO 11357-3:2018. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO 75-2:2013 (technically equivalent to ASTM D648). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation: Tensile properties may be tested according to ISO 527:2019 (technically equivalent to ASTM D638) using a Type 1A ISO tensile bar (length of 80 mm, width of 10 mm, and thickness of 4 mm). The testing temperature may be 23° C., and the testing speeds may be 5 mm/min. "Weldline" tensile properties may also be determined using the test method referenced above. For such properties, a double-gated ISO tensile bar (length of 80 mm, width of 10 mm, and thickness of 4 mm).

Flexural Modulus, Flexural Stress, and Flexural Elongation: Flexural properties may be tested according to ISO 178:2019 (technically equivalent to ASTM D790). This test may be performed on a 64 mm support span. Tests may be run on the center portions of uncut ISO 3167 multi-purpose bars. The testing temperature may be 23° C. and the testing speed may be 2 mm/min.

Charpy Impact Strength: Charpy properties may be tested according to ISO 179-1:2010 (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C.

Example 1

Comparative Example 1 is formed from 58 wt. % of a liquid crystalline polymer (LCP 1), 37 wt. % of calcium pyrophosphate, and 5 wt. % of a noble metal catalyst (palladium 3.5% on kaolin). LCP 1 is formed from 60% HBA, 4.25% HNA, 12.5% BP, 17.5% TA, and 5% APAP. Compounding was performed using a 32-mm twin screw extruder.

Example 2

Comparative Example 2 is formed from 66.2 wt. % of LCP 1, 30 wt. % of glass fibers, 3.5 wt. % of a noble metal catalyst (palladium 3.5% on kaolin), and 0.3 wt. % of a lubricant. Compounding was performed using a 32-mm twin screw extruder.

Example 3

Example 3 is formed from 66.2 wt. % of LCP 1, 30 wt. % of wollastonite fibers (Nyglos™ 8), 3.5 wt. % of a noble metal catalyst (palladium 0.25% on kaolin), and 0.3 wt. % of a lubricant.

Examples 1-3 are tested for thermal and mechanical properties. The results are set forth below.

| Sample | Ex. 1 | Ex. 2 | Ex. 3 |
| --- | --- | --- | --- |
| DTUL at 1.8 MPa (° C.) | 216 | 245 | 236 |
| Charpy Notched (kJ/m$^2$) | — | — | 9.2 |
| Charpy Unnotched (kJ/m$^2$) | — | — | 24.9 |
| Tensile Strength (MPa) | 82 | 140 | 127 |
| Tensile Modulus (MPa) | 8,000 | 15,000 | 13,099 |
| Tensile Elongation (%) | 2.6 | 1.7 | 2.08 |
| Weldline Tensile Strength (MPa) | 21 | 26 | 25 |
| Weldline Tensile Modulus (MPa) | 7,242 | 8,329 | 7,761 |
| Weldline Tensile Elongation (%) | 0.30 | 0.33 | 0.38 |
| Flexural Strength (MPa) | 110 | 200 | 141 |
| Flexural Modulus (MPa) | 8 | 12 | 12,162 |
| Flexural Elongation (%) | — | — | 2.28 |
| Melt Viscosity (Pa-s) at 1,000 $s^{-1}$ | — | — | 28.5 |
| Melting Temperature (° C., 1$^{st}$ heat of DSC) | — | — | 323 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An antenna module comprising:
   a dielectric on which is disposed one or more antenna elements configured to transmit and/or receive a radiofrequency signal;
   a communication circuit for processing the radiofrequency signal;
   an interconnect member that is electrically connected with the communication circuit and the antenna elements, wherein the interconnect member optionally contains a substrate on which a metal coating is disposed;
   optionally, a shield member covering the communication circuit that contains is a substrate on which a metal coating is disposed; and
   wherein the dielectric, and/or the substrate of the interconnect member is formed from a polymer composition comprising silicate fibers distributed within a polymer matrix containing a thermotropic liquid crystalline polymer, and/or
   wherein the dielectric, the substrate of the interconnect member, and/or the substrate of the shield member is formed from a polymer composition comprising silicate fibers distributed within a polymer matrix containing a thermotropic liquid crystalline polymer.

2. The antenna module of claim 1, wherein the polymer composition exhibits a weldline tensile break strain of about 0.3% or more as determined in accordance with ISO 527: 2019.

3. The antenna module of claim 1, wherein the polymer composition exhibits a weldline tensile break strain of about 0.35% or more as determined in accordance with ISO 527:2019.

4. The antenna module of claim 1, wherein the polymer composition exhibits a melt viscosity of from about 0.1 to about 80 Pa-s as determined at a shear rate of 1,000 s$^{-1}$ and a temperature of about 15° C. about greater than a melting temperature of the polymer composition.

5. The antenna module of claim 1, wherein the polymer composition has a melting temperature of from about 280° C. to about 400° C.

6. The antenna module of claim 1, wherein the polymer composition exhibits a deflection temperature under load of about 200° C. or more as determined at 1.8 MPa.

7. The antenna module of claim 1, wherein liquid crystalline polymers constitute from about 40 wt. % to about 90 wt. % of the polymer composition.

8. The antenna module of claim 1, wherein the thermotropic liquid crystalline polymer contains repeating units derived from one or more aromatic dicarboxylic acids, one or more aromatic hydroxycarboxylic acids, or a combination thereof.

9. The antenna module of claim 8, wherein the aromatic hydroxycarboxylic acids include 4-hydroxybenzoic acid, 6-hydroxy-2-naphthoic acid, or a combination thereof.

10. The antenna module of claim 8, wherein the aromatic dicarboxylic acids include terephthalic acid, isophthalic acid, 2,6-naphthalenedicarboxylic acid, or a combination thereof.

11. The antenna module of claim 8, wherein the thermotropic liquid crystalline polymer further contains repeating units derived from one or more aromatic diols.

12. The antenna module of claim 11, wherein the aromatic diols include hydroquinone, 4,4'-biphenol, or a combination thereof.

13. The antenna module of claim 1, wherein the thermotropic liquid crystalline polymer is wholly aromatic.

14. The antenna module of claim 1, wherein the total amount of repeating units derived from naphthenic hydroxycarboxylic and/or dicarboxylic acids is about 20 mol. % or less.

15. The antenna module of claim 14, wherein the liquid crystalline polymer contains repeating units derived from 6-hydroxy-2-naphthoic acid in an amount of from about 0.5 mol. % to about 10 mol. %.

16. The antenna module of claim 15, wherein the liquid crystalline polymer contains repeating units derived from 6-hydroxy-2-naphthoic acid and 4-hydroxybenzoic acid in a molar ratio of from about 10 to about 30.

17. The antenna module of claim 1, wherein the silicate fibers include wollastonite.

18. The antenna module of claim 1, wherein the silicate fibers have a volume average length of from about 1 to about 200 micrometers.

19. The antenna module of claim 1, wherein the silicate fibers have an aspect ratio of from about 2 to about 50.

20. The antenna module of claim 1, wherein the silicate fibers have an average diameter of about from about 1 to about 35 micrometers.

21. The antenna module of claim 1, wherein the polymer composition comprises from about 10 parts to about 80 parts by weight of the silicate fibers per 100 parts by weight of the thermotropic liquid crystalline polymer.

22. The antenna module of claim 1, wherein the polymer composition further comprises a plating additive.

23. The antenna module of claim 22, wherein the plating additive includes a laser activatable additive.

24. The antenna module of claim 23, wherein the laser activatable additive includes copper chromite.

25. The antenna module of claim 22, wherein the plating additive includes a noble metal catalyst.

26. The antenna module of claim 25, wherein the catalyst contains a noble metal component including palladium, iridium, ruthenium, platinum, rhodium, or an alloy or combination thereof.

27. The antenna module of claim 25, wherein the catalyst contains a noble metal component including palladium.

28. The antenna module of claim 25, wherein the catalyst includes a noble metal component supported by a matrix material.

29. The antenna module of claim 28, wherein the matrix material includes a silicate.

30. The antenna module of claim 1, wherein the composition is free of glass fibers.

31. The antenna module of claim 1, wherein the metal coating includes copper, nickel, or a combination thereof.

32. The antenna module of claim 1, wherein the dielectric comprises the polymer composition.

33. The antenna module of claim 32, wherein the silicate fibers of the polymer composition do not contact the interconnect member.

34. The antenna module of claim 1, wherein the substrate of the shield member comprises the polymer composition.

35. The antenna module of claim 34, wherein the silicate fibers of the polymer composition do not contact the interconnect member.

36. The antenna module of claim 1, wherein the substrate of the interconnect member comprises the polymer composition.

37. The antenna module of claim 34, wherein the silicate fibers of the polymer composition do not contact the dielectric or the shield member.

38. The antenna module of claim 1, wherein the interconnect member is arranged into a notch formed on the shield member.

39. The antenna module of claim 38, wherein the interconnect member is generally disposed coplanar with the shield member.

* * * * *